Figure 1:
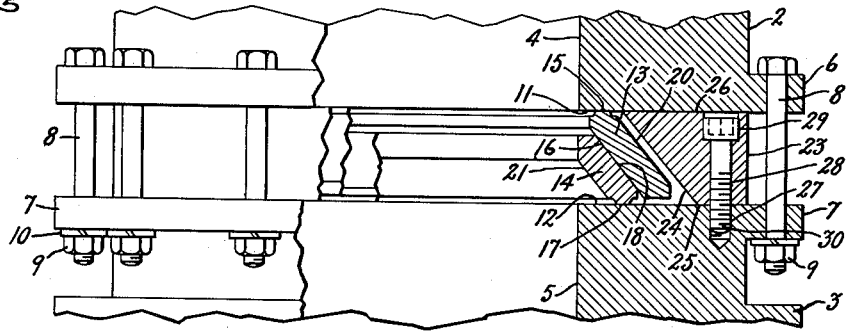

July 23, 1963  D. E. CAIN  3,098,666
SEAL
Filed July 6, 1959

Inventor:
Dallas E. Cain,
by Paul R. Franks
His Attorney.

United States Patent Office 3,098,666
Patented July 23, 1963

1

3,098,666
SEAL
Dallas E. Cain, Scotia, N.Y., assignor to General Electric Company, a corporation of New York
Filed July 6, 1959, Ser. No. 825,021
2 Claims. (Cl. 285—363)

This invention relates to seals, and more particularly, to static seals for use in high temperature and high pressure applications.

In recent years higher temperatures and pressures have been encountered in engines, such as aircraft engines. In certain instances it is desirable to direct the high temperature and high pressure working fluid to auxiliary equipment attached to the engine.

Heretofore the seal gaskets between the engine components and the auxiliary equipment to which high temperature and high pressure fluids have been supplied have been fabricated of organic materials and metals. At higher temperatures organic materials tend to deteriorate. The use of organic materials in such applications has been abandoned in favor of metal rings usually having an O cross-section.

The manufacture of the O ring seals is extremely critical and the types of metal from which the seals may be fabricated are limited. Under certain high temperature applications there is a tendency for the material of the O ring seal to anneal causing the material to take a permanent set which will result in failure of the seal. It has also been found that O ring seals cannot be manufactured presently from newer materials developed for use under such high temperature applications.

The fabrication of O ring seals is further complicated by the fact that O ring members are normally fabricated from metal tubes which are bent into a torus shape, the ends of the tube being butt welded together. Very often the welded section is imperfect and subsequent failure of the weld results in failure of the seal.

The chief object of the present invention is to provide an improved high temperature and high pressure static seal.

Another object is to provide an improved seal capable of sustaining high temperature and high unit loading.

An object is to provide an improved high temperature and high pressure static seal having continuous annular gaskets free of welded sections.

A still further object is to provide a seal capable of sustaining high temperature and high unit loading without taking a permanent set caused by the annealing of the seal material.

A still further object is to provide an improved seal having the draw down and deflection characteristics of an O ring seal while being capable of higher unit loading than an O ring seal.

These and other objects will be made more apparent from the following description.

The present invention relates to a static seal between a first housing and a second housing. The first housing and the second housing are each provided with an annular sealing surface. Two sealing members are provided, one of which at least partially envelops the other. Each sealing member has one planar sealing surface adapted to be in sealing engagement with an annular sealing surface of a housing and each sealing member is provided with a frusto-conical sealing surface. The frusto-conical sealing surface of each sealing member is adapted to be in sealing engagement with that of the other. By drawing the first and second housings together by suitable means, such as bolts, the sealing surfaces are placed in sealing engagement. The outer sealing member is stressed in such a manner as to exert circumferential tensive forces therein and the inner sealing member has circumferential compressive forces induced therein. In order to predetermine the maximum stresses induced in the sealing members, an annular stop member is placed between the first and second housings so that after a predetermined force is placed on the sealing members, further compression of the sealing members is restrained by the stop member. This stop member further performs an aligning function for the sealing members.

Figure 2:
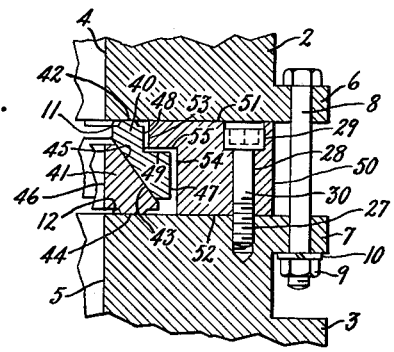
Figure 3:
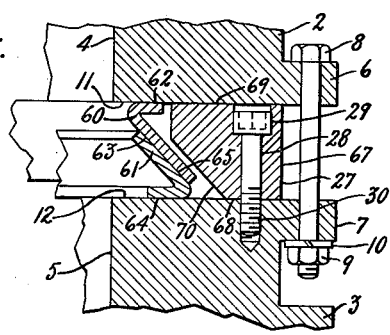

The invention will be more clearly understood from the detailed description of the preferred embodiments described in the accompanying drawings, in which FIGURE 1 is a view partially in section of a seal incorporating the present invention;

FIGURE 2 is a sectional view of another embodiment of the seal shown in FIGURE 1, and FIGURE 3 is a sectional view of still another embodiment of the invention shown in FIGURE 1.

Referring to the drawings, there is shown in FIGURE 1 a portion of a first housing 2, which may be a part of a jet aircraft engine, and a second housing 3, which may be a portion of a casing of an accessory associated with the engine into which the high temperature and high pressure working fluid of the jet engine is intended to be supplied.

The housing 2 is provided with a suitable opening 4, and the housing 3 is provided with a suitable opening 5. In order to attach these housings to one another, the first housing 2 is provided with a suitable flange 6 having suitable bolt holes, and the second housing 3 is provided with a suitable flange 7 having similar bolt holes. In order to connect these flanges of the aforementioned housings, a plurality of bolts 8 are provided which extend between the flanges 6 and 7. These bolts are tightened by means of nuts 9 having suitable lock washers 10.

As part of the present seal, an annular sealing surface 11 is provided on the housing 2 about the opening 4 therein. Similarly, an annular sealing surface 12 encircles the opening 5 in the second housing 3. In order to provide a sealing connection between the housings, a first sealing member 13 and a second sealing member 14 are provided.

The sealing member 13 has an annular first sealing surface 15 which is in sealing engagement with the annular sealing surface 11 of the housing 2. This first sealing member 13 also has a second sealing surface 16 which has a general frusto-conical shape. The first sealing member also has an outer surface 20 which also has a frusto-conical shape. It will be noted that the first sealing member 13 has an appearance of a tapered ring.

The second sealing member 14 is enveloped substantially by the first sealing member 13. This second sealing member has a first annular sealing surface 17 which is adapted to be in sealing engagement with the annular sealing surface 12 of the second housing 3. The second sealing member 14 has a second sealing surface 18 which is frusto-conical in shape and has substantially the same taper as the frusto-conical surface 16 of the first sealing member 13. It will be appreciated that the frusto-conical sealing surfaces of the first and second members are intended to provide a sealing function therebetween. The second sealing member 14 has an inner surface 21 which is also frusto-conical in shape, giving the second sealing member 14 also the appearance of a tapered ring. Because of the high temperature and high pressure use of such seals, the annular sealing members are normally fabricated of metals, such as Inconel.

By suitably locating the first and second sealing members between the flanges 6 and 7 and tightening the plurality of bolts 8, the first and second sealing members will be compressed between these flanges. The reaction to the tightening of the bolts will be transmitted between the sealing surfaces 11 of the housing 2 and the sealing surface 15 of the first sealing member 13. These forces will also be transmitted between the frusto-conical sealing surfaces 16 and 18 of the first and second sealing members, and then the forces will be transmitted through to the sealing surface 17 of the second sealing member 14 to the sealing surface 12 of the second housing 3. The general nature of the forces so transmitted is compressive in nature. However, since the first and second sealing members are annular in shape and because of the frusto-conical surfaces 16 and 18, it is clear from FIGURE 1 that there will be a tendency for the first annular sealing member 13 to expand, creating circumferential tensive forces in the sealing member. Simultaneously, the second sealing member 14, which is enveloped by the first sealing member, will have forces exerted therein tending to shrink this annular member and thereby create circumferential compressive forces therein. By this means, suitable deflection of the sealing members will be experienced while maintaining unit loadings on the sealing surfaces. The loadings on the sealing surfaces can be controlled by the area thereof, and the deflection can be controlled by the taper angle of the frusto-conical sealing surfaces and also by the cross-sectional area of the first and second sealing members.

In order to control the maximum stress placed on the first and second sealing members, a suitable annular stop member 23 may be provided. In FIGURE 1 this annular stop member is provided with two parallel planar surfaces 25 and 26 which are adapted to engage the sealing surfaces 12 and 11, respectively. The thickness of such a stop member determines when it will restrain the compressive forces induced by the bolts between the flanges 6 and 7. At the point of engagement with the stop, the force applied by the bolts is supported by the stop member rather than the first and second sealing members. This is possible because the axial length of the first and second sealing members is less than the thickness of the stop member 23. This prevents over-stressing of the sealing members.

The stop member 23 in the embodiment of FIGURE 1 has an inner frusto-conical surface 24 which is adjacent the frusto-conical surface 20 of the first sealing member 13. This surface 24 may be a continuous surface or merely a partial abutment. This surface is intended to align the sealing members 13 and 14 so that the opening in the sealing members is substantially in alignment with the openings 4 and 5 in the first and second housings. Naturally, the alignment between openings 4 and 5 is determined by the bolt holes in the flanges 6 and 7.

In many applications it is desirable that the seal gaskets be retained adjacent one of the housings rather than have the sealing members separable to permit damage to occur to the seal by falling from the housing at the time of disassembly. To achieve this function, it will be noted that the surface 25 not only envelops the first and second sealing members, but also in the event that the flange 6 were removed, the stop member 23 would restrain any movement of the sealing members toward the flange 6. In FIGURE 1 the stop member 23 is provided with a plurality of suitable holes 28 having suitable countersunk portions 29. The flange 7 of the second housing has suitable threaded openings 27 in alignment with the holes 28. By means of suitable cap screws placed in the holes 28 and tightened into the threaded holes 27, the stop member 23 can be attached to the second housing 3. In the event the nuts 9 are removed from the bolts 8, followed by removal of the housing 3 from the housing 2, the stop member will retain the first and second sealing members with the housing 3, assuring that no damage occurs to the sealing members 13 and 14.

FIGURE 2 is directed to another embodiment of the invention wherein the first housing 2 and the second housing 3 are connected by means of bolts 8. The bolts 8 also extend between the flanges 6 and 7, thereby connecting the openings 4 and 5 of the first and second housings 2 and 3. In this embodiment the first sealing member 40 has an annular sealing surface 42 which is in sealing engagement with the annular sealing surface 11 of the first housing 2. The first sealing member 40 has a frusto-conical surface 43 which is adapted to engage the frusto-conical surface 45 of a second sealing member 41. The second sealing member 41 also has an annular sealing surface 44 which is in sealing engagement with the annular sealing surface 12 of the second housing 3.

In this embodiment the second sealing member 41 has an inner cylindrical surface 46. The first sealing member 40 is provided with a first cylindrical surface 47 and a second cylindrical surface 48 which is of a smaller diameter than the cylindrical surface 47. The cylindrical surfaces 47 and 48 are connected by a shoulder portion 49. It will be appreciated that the construction in FIGURE 2 provides a sealing ring structure which is more rigid than that disclosed in FIGURE 1. The surfaces 47, 48 and shoulder 49 are provided for a purpose to be described hereinafter.

In the second embodiment shown in FIGURE 2 there is provided a stop member 50 which has parallel planar surfaces 51 and 52. The space therebetween determines the maximum stress which may be placed upon the first and second sealing members. The stop member may be attached to the second housing 3 by means of the bolts 30 in a manner similar to that described in FIGURE 1.

For the purpose of aligning the first and second sealing members so that they are substantially concentric with the openings 4 and 5 in the housings 2 and 3, respectively, the stop member is provided with the cylindrical surface 53 and the cylindrical surface 54 which is of a larger diameter than the surface 53. The surfaces 53 and 54 are connected by the shoulder portion 55. These surfaces function to retain the first and second sealing members substantially adjacent the surface 12 of the housing 3 in the event that the bolts 8 are disconnected. This is achieved by means of the surface 55 of the stop 50 abutting against the surface 49 of the first sealing member 40.

Because the first sealing member 40 has a frusto-conical surface 43 and because the first sealing member 40 envelops the second sealing member 41, the stop member 50 will retain both the first and second sealing members adjacent the housing 3.

Referring to FIGURE 3, there is disclosed another embodiment of the invention described in FIGURE 1. The housing and flange construction with the bolts 8 is similar to FIGURES 1 and 2. A stop member 67 is provided having two planar parallel surfaces 68 and 69 which determine the minimum space between the flanges 6 and 7. This stop member 67 has an inner frusto-conical surface 70 similar to the frusto-conical surface shown in FIGURE 1 and adapted to perform a similar function.

In this embodiment the first sealing member 60 and the second sealing member 61 each have a cross-section similar in shape to a figure 7. The sealing members in this embodiment are fabricated from sheet metal rings which are suitably flanged. The planar sealing surface 62 of the first sealing member 60 is adapted to be in sealing engagement with the sealing surface 11 of the first housing 2. The first sealing member also has a frusto-conical portion which provides the sealing surface 63. Similarly, the second sealing member 61 has a portion which defines the planar sealing surface 64 adapted to be in sealing engagement with the annular sealing surface 12 of the second housing 3. This second sealing member 61 has a frusto-conical portion which provides the sealing surface 65 adapted to be in sealing engagement with the surface 63 of the first sealing member 60.

The operation of this seal is similar to that described in FIGURES 1 and 2. The first sealing ring 60 has circumferential tensive forces induced therein while the inner second sealing member 61 has circumferential compressive forces induced therein. The maximum stresses are predetermined by the thickness of the stop member 67. The inner surfaces of the stop member perform an aligning function and also a retaining function in the event that the bolt connections 8 are disconnected.

There have been disclosed three embodiments of a seal having the drawn down characteristics of an O ring seal. However, these embodiments are capable of higher unit loading, and also they may be fabricated of continuous annular surfaces of material without the requirements of welded connecting sections as are necessary in the fabrication of O ring seals.

While there have been described preferred embodiments of the present invention, it will be appreciated that it is not intended that the invention be limited thereto, but that the invention be construed within the scope of the appended claims.

What I claim as new and desire to secure by Letters Patent of the United States is:

1. In a static seal, the combination of a first sealing plate, a second sealing plate, a first sealing member having a first sealing surface and a second frusto-conical sealing surface, said first sealing surface being in sealing engagement with the first sealing plate, a second sealing member having a first sealing surface and a second frusto-conical sealing surface, said first sealing surface of the second sealing member being in sealing engagement with the second sealing plate, said second frusto-conical sealing surface of the first sealing member being in sealing engagement with the second frusto-conical sealing surface of the second sealing member, said first sealing member at least partially enveloping the second sealing member, bolt means for urging the first sealing plate toward the second sealing plate to place the first and second sealing members under longitudinal compressive forces to create circumferenial tensive forces in the first sealing member accompanied by circumferential compressive forces in the second sealing member, and stop means located between the first and second sealing members to determine the minimum distance between the first and second sealing plates, the first sealing member and the second sealing member each having a longitudinal length less than the distance between the first and second sealing plates, said stop means additionally including an annular abutment having an inner surface for aligning the first and second sealing members between the first and second sealing plates, said stop means being attached to the second sealing plate and having at least a portion of the inner surface of the stop means coacting with the first sealing member so as to retain the first and second sealing members adjacent the second sealing plate in the event that the bolt means connecting the first and second sealing plates are disconnected.

2. In a static seal, the combination of means defining a first planar surface, means defining a second planar surface, said first and second planar surfaces being substantially parallel, a first sealing member having an annular sealing surface and a frusto-conical sealing surface, said annular sealing surface of the first sealing member being in sealing engagement with the first planar surface, a second sealing member having an annular sealing surface and a frusto-conical sealing surface, said annular sealing surface of the second sealing member being in sealing engagement with the second annular surface and the frusto-conical sealing surface of the first sealing member being in engagement with the frusto-conical sealing surface of the second sealing member, said first sealing member at least partially enveloping the second sealing member, means for urging the first surface toward the second surface to create circumferential compressive forces in the second sealing member by its engagement with the first sealing member upon which are exerted circumferential tensive forces, stop means located between the first and second planar surfaces for determining the minimum distance between said planar surfaces, the first sealing member and the second sealing member each having a longitudinal length less than the minimum distance between the first and second planar members as determined by the stop means, said stop means enveloping said first sealing member and including abutment means whereby the first and second sealing members are retained adjacent the second planar surface upon disengagement of the annular sealing surface of the first sealing member from sealing engagement with the first planar surface.

References Cited in the file of this patent

UNITED STATES PATENTS

| 519,805 | Bavier | May 15, 1894 |
| 1,468,187 | Werbeck | Sept. 19, 1923 |
| 1,652,418 | Sherrerd | Dec. 13, 1927 |

FOREIGN PATENTS

| 461,593 | Germany | Feb. 3, 1927 |
| 723,062 | France | Jan. 9, 1932 |
| 750,770 | France | June 6, 1933 |
| 1,067,423 | France | June 15, 1954 |